(12) United States Patent
Munley et al.

(10) Patent No.: US 11,809,777 B2
(45) Date of Patent: Nov. 7, 2023

(54) VIRTUAL DEMONSTRATION OF AUDIO SYSTEM SETUPS

(71) Applicant: Bose Corporation, Framingham, MA (US)

(72) Inventors: Steven Edward Munley, Bellingham, MA (US); Caroline T. Webber, Slatersville, RI (US); Christian Bousquet, Charlton, MA (US); Nicole Michelle Curran, Brookline, NH (US); Francis P. Flannery, Westminster, MA (US)

(73) Assignee: Bose Corporation, Framingham, MA (US)

( * ) Notice: Subject to any disclaimer, the term of this patent is extended or adjusted under 35 U.S.C. 154(b) by 95 days.

(21) Appl. No.: 17/386,502

(22) Filed: Jul. 27, 2021

(65) Prior Publication Data

US 2022/0027122 A1    Jan. 27, 2022

Related U.S. Application Data

(60) Provisional application No. 63/057,285, filed on Jul. 27, 2020.

(51) Int. Cl.
*G06F 3/16* (2006.01)
*G06T 19/00* (2011.01)
*G06F 3/01* (2006.01)
*H04N 21/81* (2011.01)

(52) U.S. Cl.
CPC .............. *G06F 3/165* (2013.01); *G06F 3/011* (2013.01); *G06F 3/167* (2013.01); *G06T 19/006* (2013.01); *H04N 21/8106* (2013.01)

(58) Field of Classification Search
CPC .......... G06F 3/165; G06F 3/011; G06F 3/167; G06T 19/006; H04N 21/8106
See application file for complete search history.

(56) References Cited

U.S. PATENT DOCUMENTS

| | | | |
|---|---|---|---|
| 9,674,633 B2 | 6/2017 | Crutchfield et al. | |
| 10,091,602 B1 | 10/2018 | Crutchfield, Jr. et al. | |
| 10,284,990 B2 | 5/2019 | Crutchfield, Jr. et al. | |
| 2008/0212788 A1* | 9/2008 | Bech | H04S 7/00 381/59 |
| 2013/0156213 A1* | 6/2013 | Pan | G10K 11/17854 381/71.4 |

(Continued)

*Primary Examiner* — Fan S Tsang
*Assistant Examiner* — David Siegel (57) ABSTRACT

Techniques are disclosed for providing a virtual demonstration experience that includes presenting a user interface including an option to select between at least two configurations. The techniques also include initiating a first playback of an audio track for a first configuration, the first playback based on a binaural recording of a first audio system setup rendering the audio track. The techniques also include, in response to selection of a second configuration while the first playback of the audio track is occurring, switching to a second playback of the audio track, the second playback based on a binaural recording of a second audio system setup rendering the audio track, the second audio system setup different from the first audio system setup, wherein switching to the second playback of the audio track continues from where the first playback was prior to switching to the second playback.

20 Claims, 7 Drawing Sheets

(56) References Cited

U.S. PATENT DOCUMENTS

2015/0334505 A1* 11/2015 Crutchfield .............. H04S 7/30
                                                                                    381/17
2019/0239019 A1    8/2019  Crutchfield, Jr. et al.

\* cited by examiner

VIRTUAL DEMONSTRATION OF AUDIO SYSTEM SETUPS

RELATED APPLICATIONS

This application is a nonprovisional of and claims priority to U.S. Provisional Patent Application No. 63/057,285, filed on Jul. 27, 2020, the entire contents of which are incorporated herein by reference.

BACKGROUND

Providing demonstrations of audio equipment, especially when not using the audio equipment in person, can be difficult. Even in person, many customers face difficulties when listening to audio systems in retail stores to review/assess acoustic performance. When the customer arrives at the store, the demonstration may provide a sub-par experience for a number of reasons, such as due to the challenging acoustics of the store and the noise in the space. For instance, for out-loud audio devices, such as soundbars and speakers, the retail space may be a warehouse without close walls and/or ceilings to reflect sound back to the listener. Further, often audio products are elevated on a shelf, thereby creating issues with bass performance as the product is not coupling with the floor, which leaves the product to sound "thin" or otherwise undesirable.

SUMMARY

All examples and features mentioned below can be combined in any technically possible way.

In one aspect, a method includes: presenting a user interface that includes an option to select between at least two configurations; initiating a first playback of an audio track for a first configuration, the first playback based on a binaural recording of a first audio system setup rendering the audio track; and in response to selection of a second configuration while the first playback of the audio track is occurring, switching to a second playback of the audio track, the second playback based on a binaural recording of a second audio system setup rendering the audio track, the second audio system setup different from the first audio system setup, wherein switching to the second playback of the audio track continues from where the first playback was prior to switching to the second playback.

Examples may include one of the following features, or any combination thereof.

In some examples, the user interface includes a visual for each audio device setup. In some examples, the user interface includes a visual indication that the second configuration has been selected, thereby indicating that the second playback of the audio track is occurring. In some examples, the first playback is initiated automatically when the user interface is first presented. In some examples, the first playback is initiated by user input. In some examples, there is no interruption in audio playback when switching to the second audio playback. In some examples, a video is presented via the user interface and playback of the video is synchronized with playback of the audio track. In some examples, the first audio system setup includes using speakers of a television in a given environment and the second audio system setup includes using a soundbar in the given environment. In some examples, the second audio system setup also includes using at least one of i) a remote subwoofer or ii) one or more remote surround sound speakers.

In some examples, the first audio system setup and the second audio system setup include the same audio equipment in different environments. In some such examples, the different environments include rooms of differing size and/or different materials within the environment. In some examples, the method further includes prompting a user to wear headphones to improve playback of the binaural recordings. In some examples, the binaural recordings of the first and second audio systems rendering the audio track are corrected with an equalization filter. In some examples, the audio track is the same for the first and second playbacks of the audio track to allow a user to compare playback of the audio track by the first and second audio system setups. In some examples, the method further includes in response to selection of a third configuration while the second playback of the audio track is occurring, switching to a third playback of the audio track, the third playback based on a binaural recording of a third audio system setup rendering the audio track, the third audio system setup different from the first and second audio system setups, wherein switching to the third playback of the audio track continues from where the second playback was prior to switching to the third playback. In some such examples, the method further includes in response to selection of the first configuration while the third playback of the audio track is occurring, switching to the first playback of the audio track, wherein switching to the first playback of the audio track continues from where the third playback was prior to switching to the first playback. Further, in some such examples, the second and third audio system setups each include using the same soundbar in a given environment. Further still, in some such examples, the third audio system setup also includes using at least one of i) a remote subwoofer or ii) one or more remote surround sound speakers. Further yet, in some such examples, the second and third audio system setups each include using different soundbars in a given environment.

In some examples, the first audio system setup includes using speakers of a television in the given environment. In some examples, in response to selection of a third configuration while the first playback of the audio track is occurring, the method further includes switching to a third playback of the audio track, the third playback based on a binaural recording of a third audio system setup rendering the audio track, the third audio system setup different from the first and second audio system setups, wherein switching to the third playback of the audio track continues from where the first playback was prior to switching to the third playback. In some such examples, the second and third audio system setups each include using different soundbars in a given environment. Further, in some such examples, the second and third audio system setups each include using the same soundbar in a given environment. In some such examples, the third audio system setup also includes using at least one of i) a remote subwoofer or ii) one or more remote surround sound speakers. In some such examples, the first audio system setup includes using speakers of a television in the given environment.

In another aspect, devices and/or systems can be used to implement any of the example methods provided above, where such devices and/or systems could include a computer, a kiosk, a wearable device (e.g., headphones or earbuds), and/or any other componentry as can be understood based on this disclosure (e.g., a display, one or more processors, memory, etc.).

In some examples, implementations include one of the above and/or below features, or any combination thereof.

DETAILED DESCRIPTION

As previously described, demonstrating audio equipment faces numerous challenges. For instance, many audio systems utilize arrays and need distance for sound to array properly to create a compelling spatial presentation. In the context of audio-for-video (A4V) systems, such as soundbars or surround sound audio systems, a retail demonstration is often in an aisle and the customer is typically forced to be very close to the product, which does not allow the arrays to fully develop as they would when, e.g., on a couch at home. This leaves the sound centered and does not allow for it to be perceived as very wide or surrounding. The general equalization of the sound is also typically not desirable or pleasing at a close distance, such as less than one meter (which is typically the space a customer has to experience in-store demonstrations).

Thus, the present disclosure describes systems and methods of virtually demonstrating different audio system setups. This is achieved by synchronizing binaural recordings of the different audio system setups rendering/playing the same audio track, such as a song or an audio track for a video. As the binaural recordings are synchronized, a user interface can be presented to a user to allow the user to switch between the different recordings while the audio track is being played, such that the same content is seamlessly played (e.g., without any audio breaks), but using a different recording that corresponds to the selected audio system setup configuration. The techniques also allow audio system setups to be demonstrated in a manner that is consistent with their intended design.

The binaural recordings can be taken using a binaural microphone array to record the out loud audio track being rendered by the different audio system setups. This can be used to demonstrate how different audio equipment in the same environment sounds, thereby allowing a user to compare, using the same audio track, the sound output by the different recordings. This can also or alternatively be used to demonstrate how the same audio equipment in different environments sounds, thereby allowing a user to determine an optimal room and/or material for a given audio system, such as a soundbar with or without accompanying subwoofer and/or rear surround sound speakers) or surround sound audio system. In some implementations, the recorded binaural files are optionally corrected with an equalization filter, such as to best represent acoustic performance heard in the room over generic headphones and/or speakers. The audio equipment or audio system setups could include a single speaker or multiple speakers. The A user can access the virtual demonstration user interface via the Internet, such as by browsing to the interface using a web browser on a computing device (e.g., a smartphone, tablet computer, laptop computer, etc.). In some implementations, it is desired that the user wear headphones or earbuds (or another device/system that provides separate left and right channel playback, such as an open-ear worn audio device or stereo paired speakers) to be able to better experience playback of the binaural recordings. In some such implementations, the user interface provides a prompt to inform the user to use headphones or earbuds for the experience. The user interface may be used to let the user change the configuration based on the playback content/track, audio system, included accessories (e.g., subwoofer and/or surround speakers), room size, and/or room materials, where each configuration utilizes a different binaural recording that was pre-recorded. In some implementations, the demonstration could be accessed via a kiosk or other display inside of a store or building, such as to demonstrate speakers or soundbars that are not physically playing. Such implementations could utilize a wearable device, such as headphones or earbuds, to allow a user to simulate the sound from the speaker or soundbar being demonstrated. This would provide the benefit of not only being able to isolate the noise around the user so the user can better hear the demonstration, but also the benefit of the demonstration being silent to those around the user.

In some implementations, the user interface for experiencing the binaural recordings of the different audio system setups also includes video that the audio track is synchronized to, such that the user can demo the experience using a typical A4V setup. In such implementations, as the video and related audio track is playing, a user can switch between the different audio system setup configurations to hear what watching the video would sound like using the different setups, such as using just the speakers of a television, a soundbar, a soundbar plus a subwoofer, a soundbar plus rear surround speakers, or a soundbar plus a subwoofer and rear surround speakers, to name a few example configurations. The setup could also allow a user to virtually compare different audio systems (e.g., soundbars or surround sound systems) from the same company or from different companies. As will be described in more detail herein, visuals can be used to reinforce the different configurations, such as showing what the audio system setup looks like and/or showing which audio system setup is currently playing the audio track.

As will be apparent in light of this disclosure, numerous benefits are associated with the methods and systems described herein. For example, potential customers of audio systems can use the virtual demonstration experience to audition products and receive a simulation of their operation anywhere, without having to travel to a store or buying the actual system to try it out. Further, most retail stores do not setup audio systems, such as soundbars, in a manner that provides optimal or even acceptable playback conditions. Thus, the acoustic performance may not be representative of the audio system's capabilities due to product placement and/or room size. In addition, the methods and systems described herein allow a user to perform various A/B tests by switching back and forth between the different binaural audio recordings of a given audio track using different audio system setup configurations to make comparisons between the different presented configurations. This can help illustrate to a user why purchasing a sound system, such as a soundbar, to upgrade the audio for their television is a worthy investment. This may allow a user to make a determination between buying a soundbar with or without a subwoofer, as the virtual demonstration allows a user to sample the extra bass or thump in the audio playback from adding the subwoofer. This may also allow a user to determine, e.g., that the most expensive/high-end audio system, while sounding the best, is not financially worth the difference in sound, as a relatively less expensive audio system is suitable for the user's desires.

Figure 1:
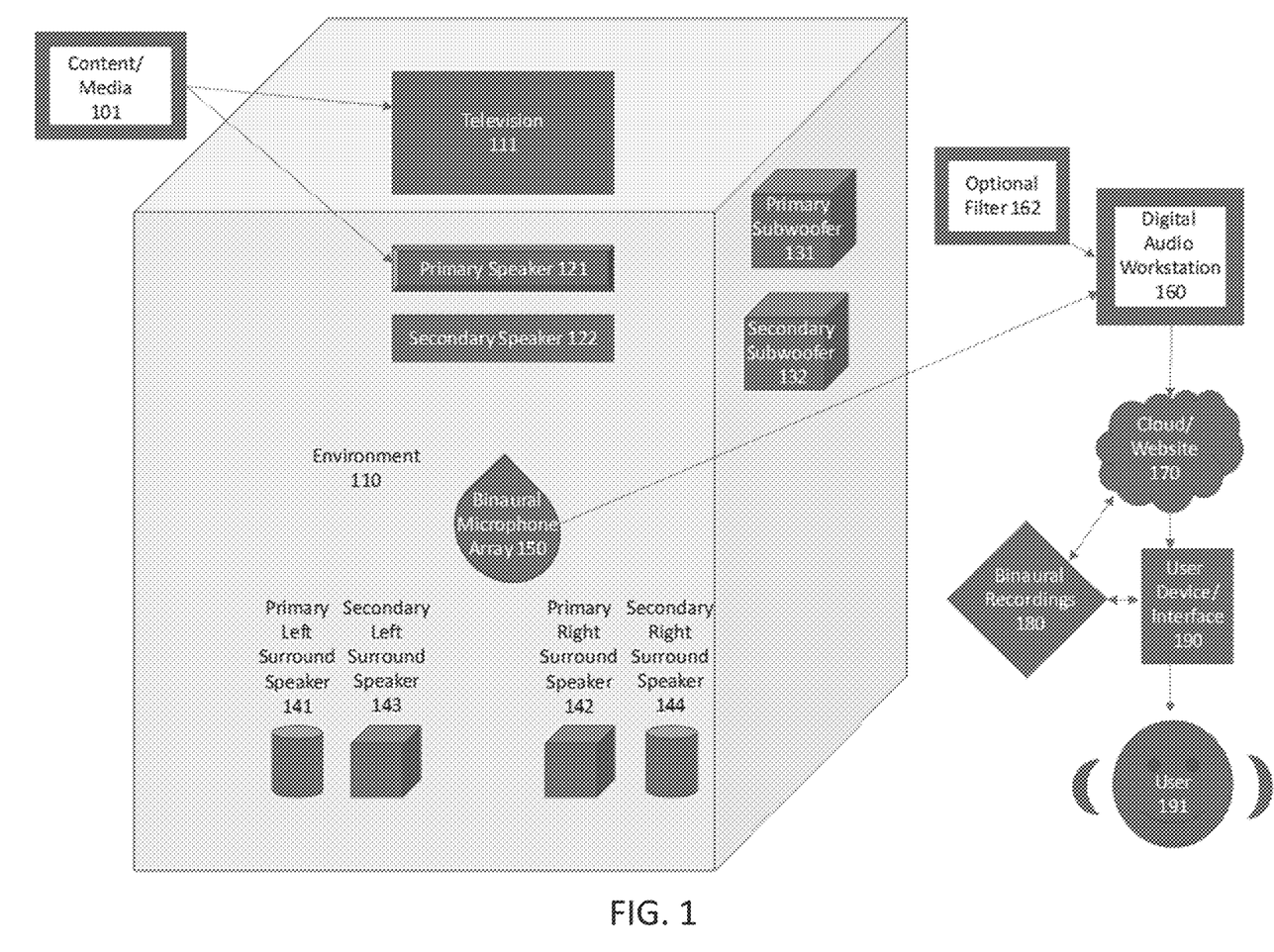
FIG. 1 illustrates a diagram of the system for capture and playback of an audio track by different audio system setups, in accordance with various aspects of the present application.

FIG. 1 illustrates a diagram of the system for capture and playback of an audio track by different audio system setups, in accordance with various aspects of the present application. The method starts by capturing binaural recordings of multiple different audio system setups, where the setups could differ based on the audio system/equipment used, the environment for the recording, or the placement of the audio system/equipment within the same environment. However, for purposes of the methods described herein, the differences primarily relate to the audio system/equipment used and/or the environment for the recording. Understandably, when capturing the binaural recordings, it is desired to minimize variables, such that if the audio system/equipment is going to change, the environment should remain as similar for each binaural recording as possible. Vice versa, if the environment is going to be changed, the audio system/equipment should be kept in as close to the same condition as possible (e.g., placing or mounting the speaker device(s) in the same manner, not changing any settings of the system between recordings, etc.).

Capture starts by selecting content/media to be used for the audio track(s) to be recorded using binaural microphone array 150 in environment 110. The content/media or audio track(s) is provided to the audio systems to be recorded, which in this example diagram include television 111, primary speaker 121, and secondary speaker 122. Note that primary and secondary speakers 121, 122 are soundbars in this example setup for purposes of illustration. Additional speakers within environment 110 (which is a rectangular-shaped room in this example setup) include primary subwoofer 131, secondary subwoofer 132, primary left surround speaker 141, primary right surround speaker 142, secondary left surround speaker 143, and secondary right surround speaker 144, which are all accessory speakers that may be coupled with one or both of primary and secondary speakers 121, 122 to capture different playback configurations. For instance, for the given environment 110, binaural microphone array 150 can be used to record the following combinations: 111, 121, 122, 121+131, 121+132, 121+141+142, 121+143+144, 122+141+142, 122+143+144, 121+131+141+142, 121+132+141+142, 121+131+143+144, 121+132+143+144, 122+131+141+142, 122+132+141+142, 122+131+143+144, 122+132+143+144.

Continuing with the example diagram of FIG. 1, once the binaural recordings are captured for the different audio system setups, which could include varied audio systems/equipment and/or different environments, they are provided to a digital audio workstation 160 or some other suitable computing device to compile and synchronize the binaural audio recordings to ultimately be played via user device/interface 190. In some implementations, the recorded binaural files are optionally corrected with an equalization filter 162, such as to best represent acoustic performance heard in the room over generic headphones and/or speakers, or for some other desired purpose. For instance, optional filter 162 may be applied to correct for known inaccuracies that are inherent in the binaural microphone array 150 and/or used to ensure the most accurate playback of the demonstration material. The final binaural recordings 180 can then be provided to user device/interface 190 via the cloud (e.g., via a website or an app) 170 for a user 191 to experience the virtual demonstrations recorded.

Figure 2A:
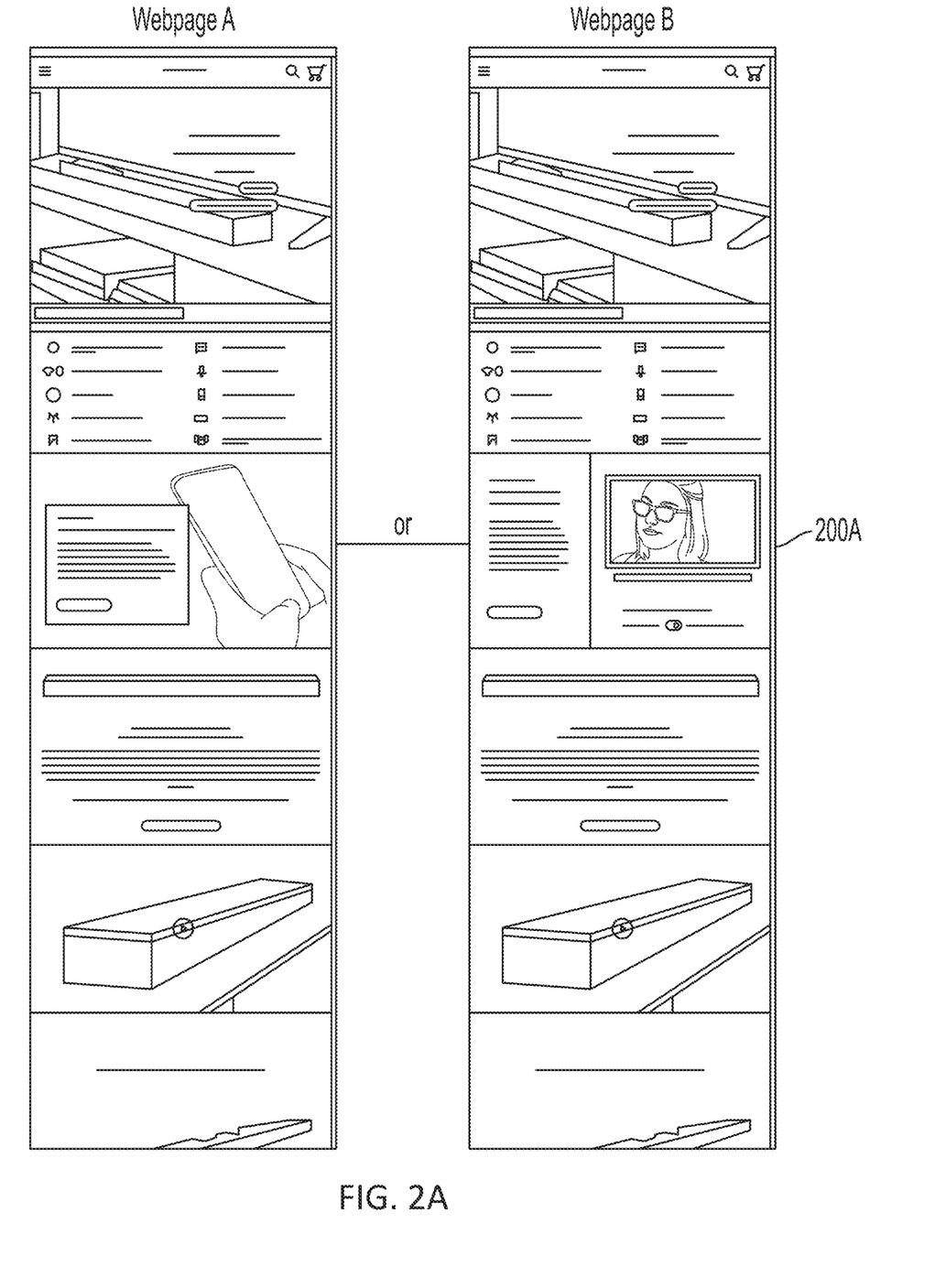
FIGS. 2A and 2B illustrate an example wireframe reference of a user interface flow for experiencing a virtual demonstration for multiple audio system setups, in accordance with various aspects.
Figure 2B:
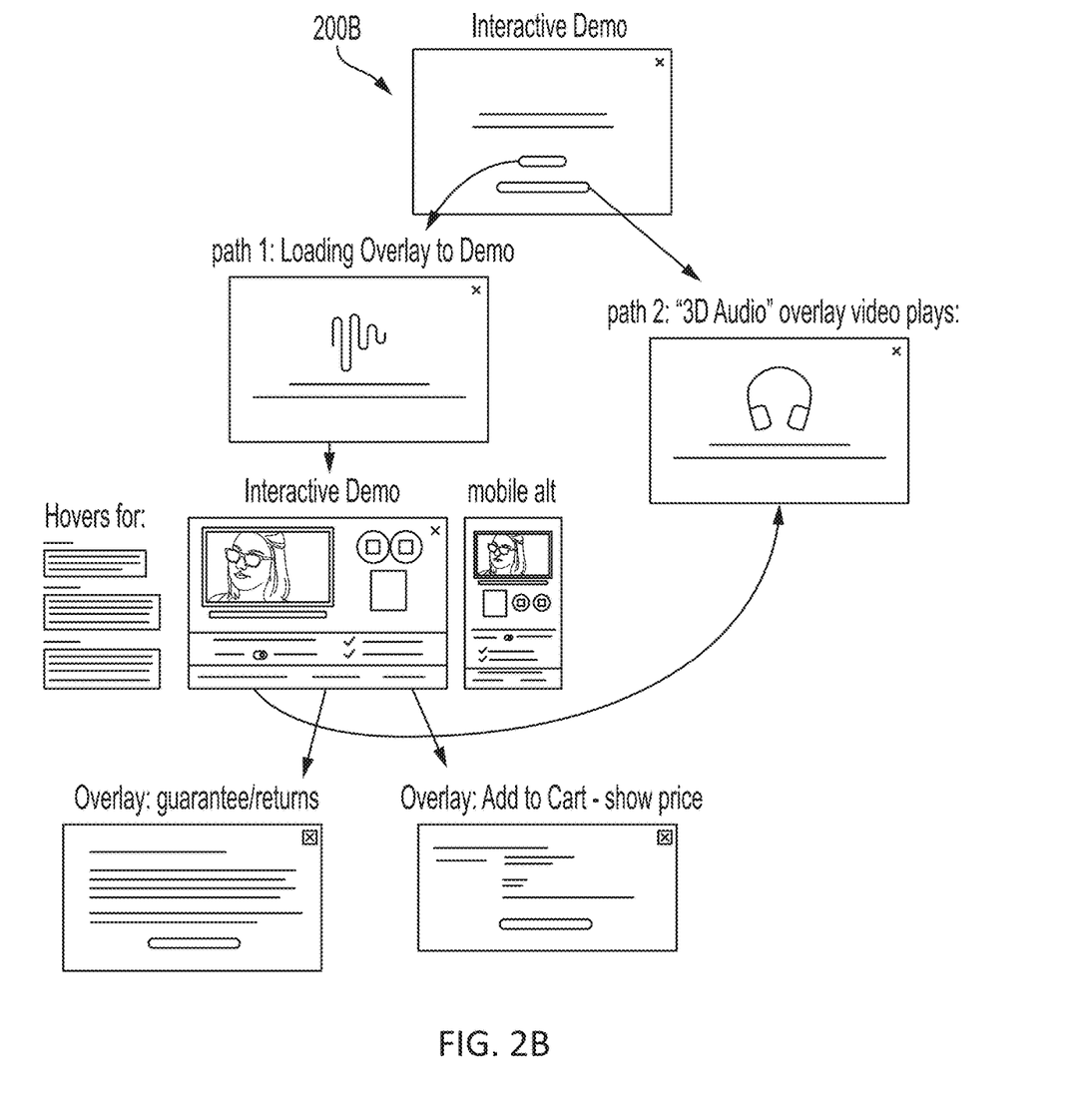

FIGS. 2A and 2B illustrate an example wireframe reference of a user interface flow for experiencing a virtual demonstration for multiple audio system setups, in accordance with various aspects. The user interface flow starts in FIG. 2A with example webpage views (Webpage A and Webpage B) of how to access the virtual demonstration. Specifically, there is a description and a "Start Demo" option from each webpage to compare TV Sound to the Bose Soundbar 700. Once a user selects "Start Demo", it continues from 200A in FIG. 2A to 200B in FIG. 2B to present the Interactive Demo screen, which in this case is a popup that displays over the website, although, it could be a separate webpage that is navigated to by selecting the "Start Demo" option. In this example flow, the Interactive Demo begins by prompting the user to wear quality headphones for the best experience. From that screen, the user can proceed to the virtual demo or learn more about how the virtual demo (named Bose Auditioner™ in this example diagram) works. Selecting "How Bose Auditioner™ works" from that screen takes the user down path 2 to learn more about the virtual demo.

Selecting "Start Demo" from that screen takes the user down path 1, which includes providing the demo to the user as shown. As shown, the demo includes a video that can be played using one of five different configurations that each have a corresponding binaural recording to play the audio track that accompanies and synchronized to the video. The video includes a play/pause button and a progress bar to allow the user to select where in the video playback will occur. A mobile alternative version is provided to the full website experience, as shown. There is also an option to add the product(s) being demoed to a virtual cart to purchase the product(s). The five different configurations include: tv sound ("TV Sound"), soundbar ("Soundbar 700"), soundbar plus subwoofer ("Bass Module 700"), soundbar plus rear surround speakers ("Surround Speakers"), or soundbar plus subwoofer plus rear surround speakers (which is the setting that is selected as visually indicated).

This interface enables a user to select the different audio system setup configuration either before or while the video is playing (and thus, the associated audio track is playing). If selection of a different configuration occurs while the video and audio track playback is occurring, the virtual demo switches seamlessly from playing the binaural recording of the initial configuration to the binaural recording for the selected configuration. For instance, if the demo start by playing the video with the TV sound binaural recording (either automatically or in response to user input to play the video), and then the user selects to the soundbar configuration (e.g., by toggling the button below "Click to hear the difference." or by selecting on the soundbar, then the virtual demo seamlessly (without audio dropout) switches to the binaural recording of the audio track using the soundbar. This is done by keeping all of the binaural recordings of the audio track synchronized to allow a user to switch between the different recordings (corresponding to the different configurations and audio system setups).

Figure 3A:
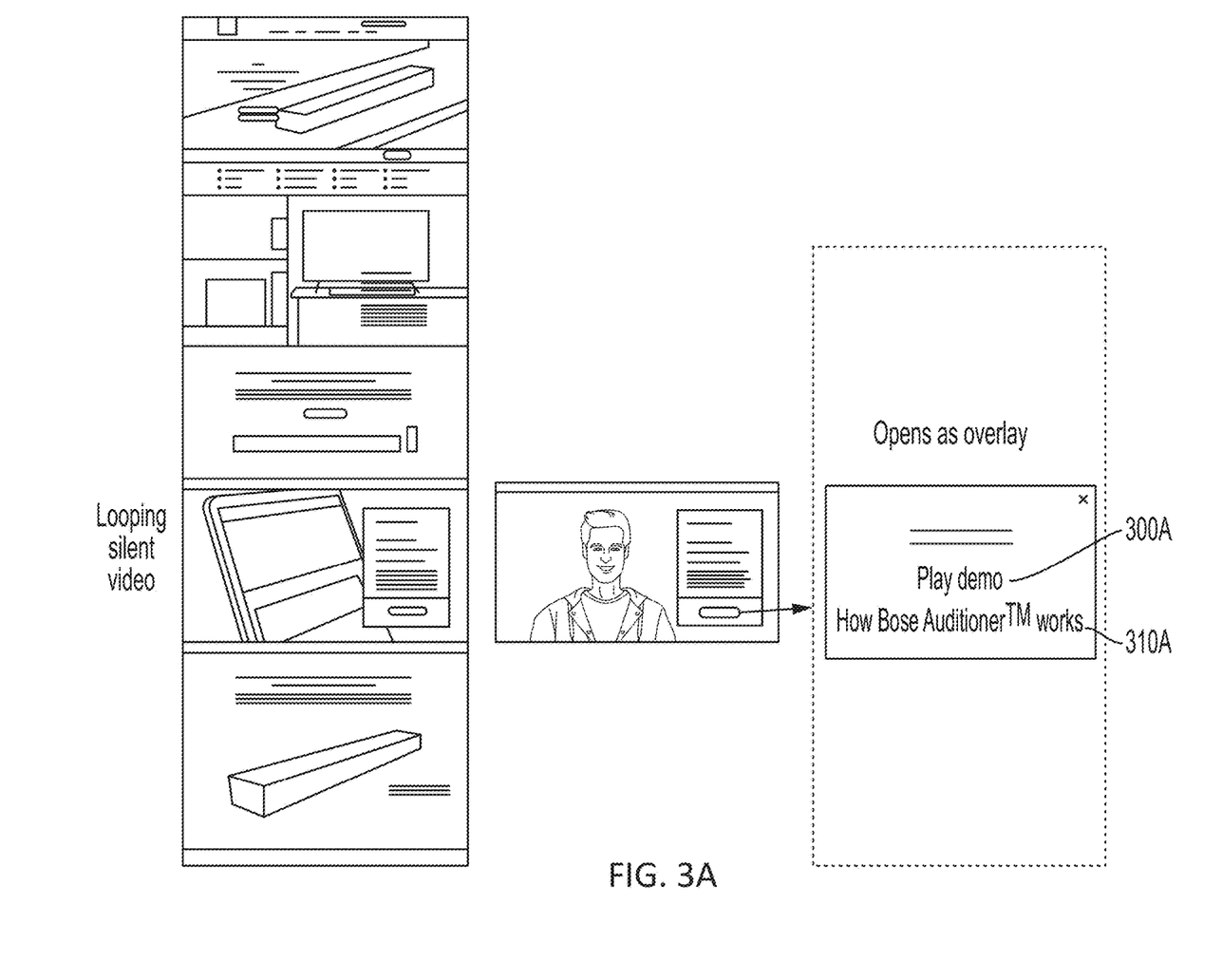
FIGS. 3A and 3B illustrates an additional example wireframe reference of a user interface flow for experiencing a virtual demonstration for multiple audio system setups, in accordance with various aspects.
Figure 3B:
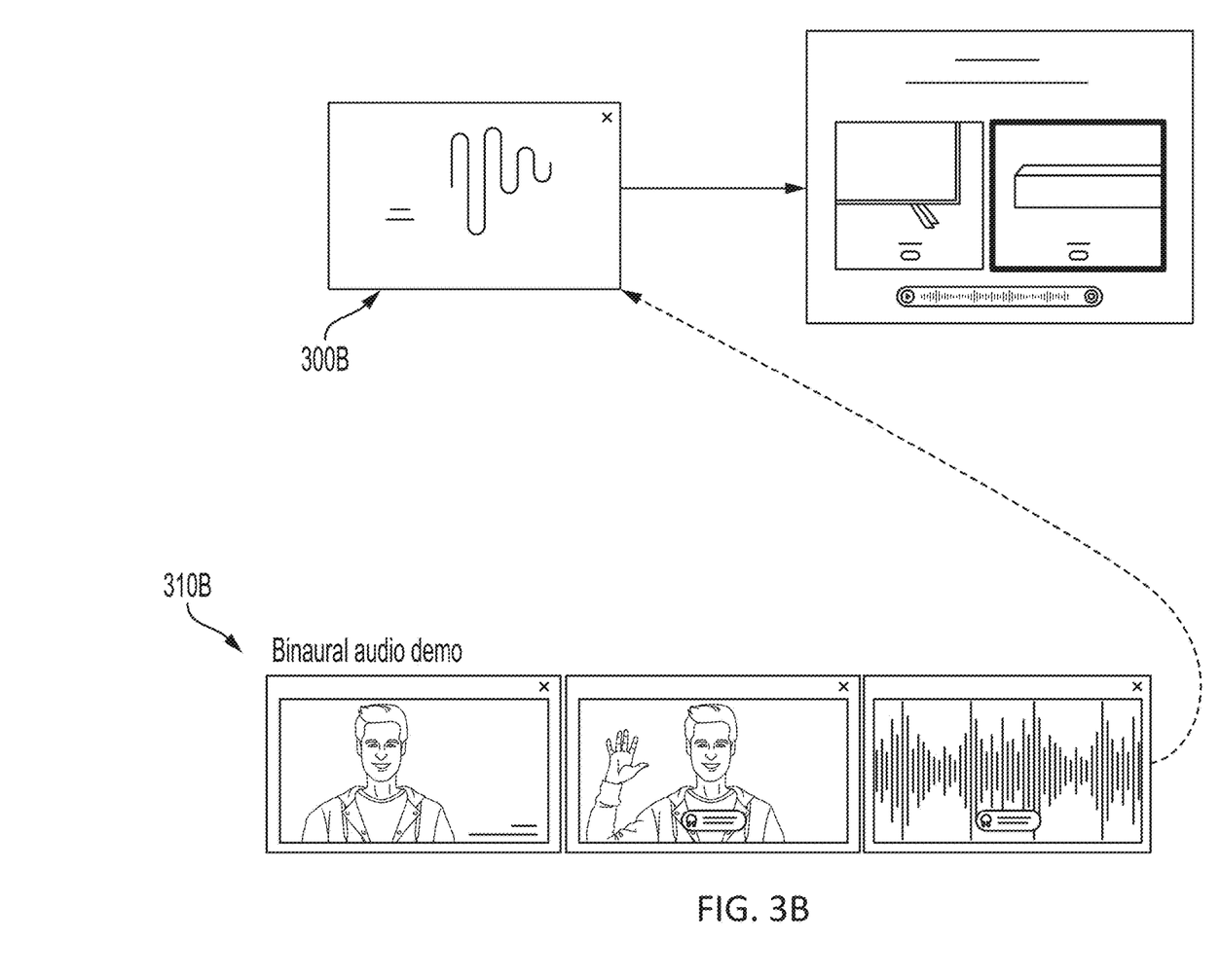

FIGS. 3A and 3B illustrate an additional example wireframe reference of a user interface flow for experiencing a virtual demonstration for multiple audio system setups, in accordance with various aspects. The user interface flow is similar to what was described for the flow in FIGS. 2A and 2B, with some UI differences. Primarily, the virtual demo is provided as a relatively more simplistic A/B demo between the TV sound and the soundbar shown. The portion shown in FIG. 3A can continue from 300A in FIG. 3A to 300B in FIG. 3B and can also continue from 310A in FIG. 3A to 310B in FIG. 3B.

Figure 4:
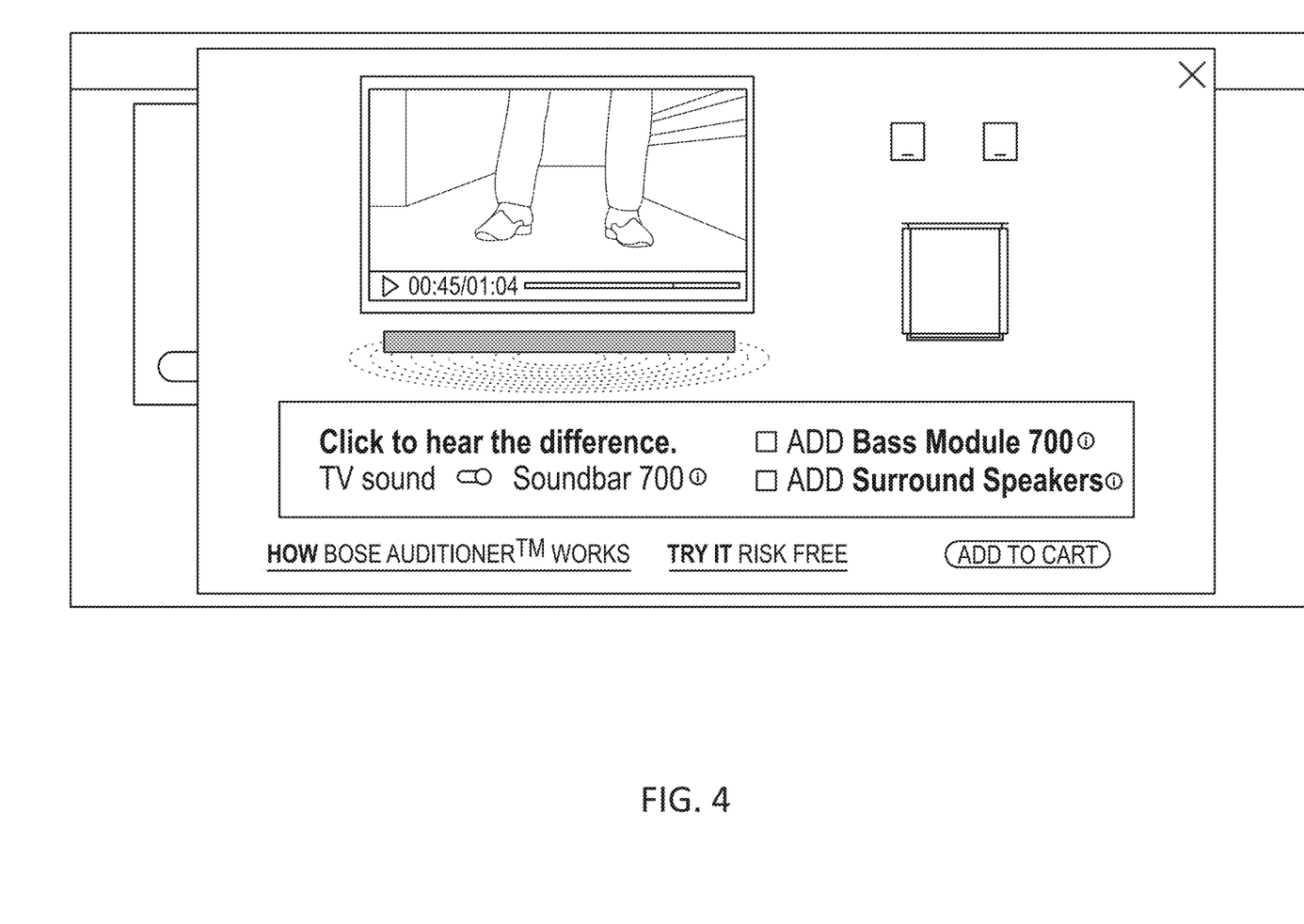
FIG. 4 is a screenshot of an example user interface for experiencing a virtual demonstration for multiple audio system setups, in accordance with various aspects.

FIG. 4 is a screenshot of an example user interface for experiencing a virtual demonstration for multiple audio system setups, in accordance with various aspects. The screenshot is similar to the virtual demo shown in FIGS. 2A and 2B and described above.

Figure 5:
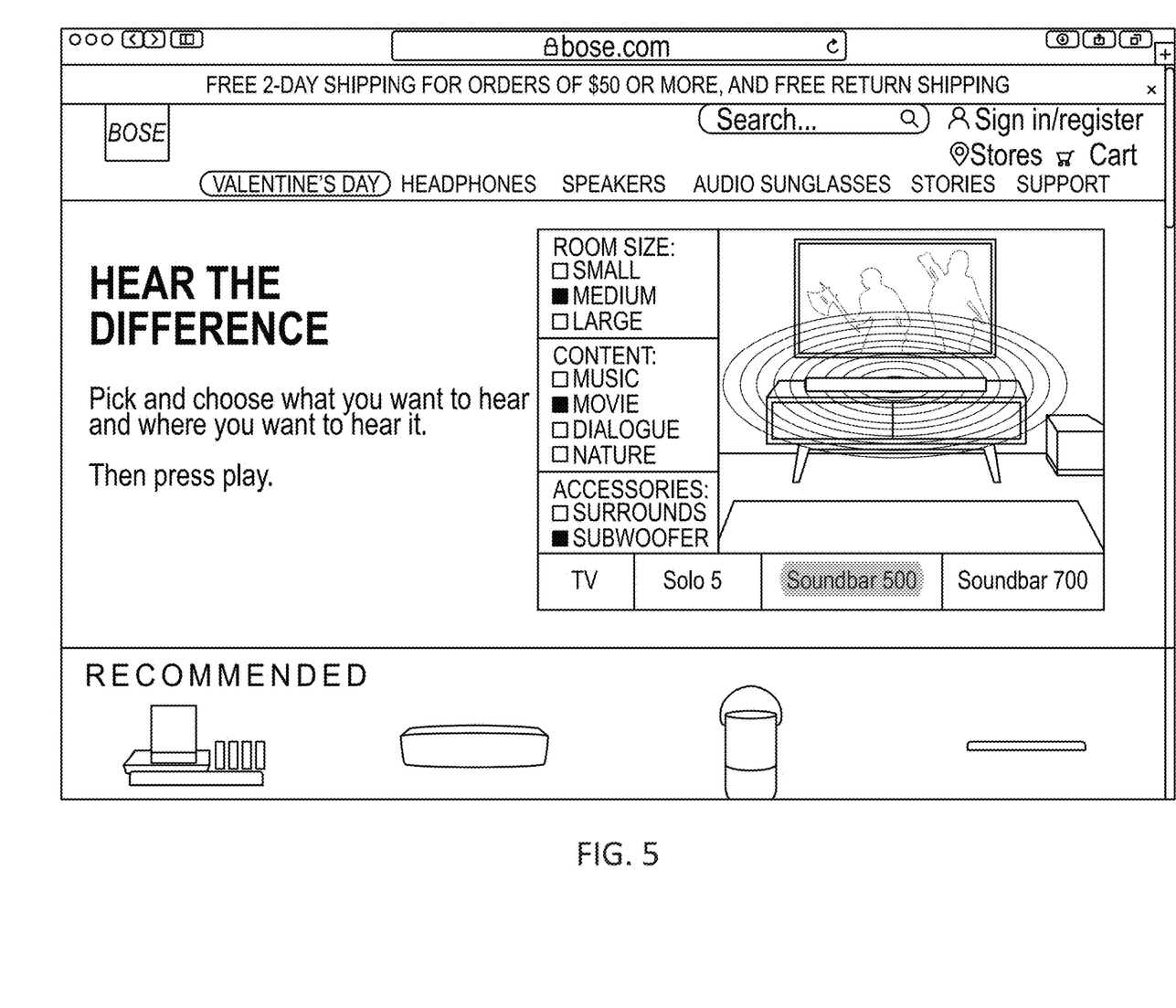
FIG. 5 is a screenshot of an additional example user interface for experiencing a virtual demonstration for multiple audio system setups, in accordance with various aspects.

FIG. 5 is a screenshot of an additional example user interface for experiencing a virtual demonstration for multiple audio system setups, in accordance with various aspects. This alternative virtual demo shows multiple different soundbars to select to demo ("Solo 5", "Soundbar 500", "Soundbar 700") in addition to the TV sound. It also allows the user to select different content type, which includes options to focus on music, movie, dialogue, and nature audio tracks. This version of the virtual demo also allows the user to select from different room sizes to see how the audio content is played with the different audio systems in different environments. Numerous different variations and configurations can be understood based on this disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The above-described examples of the described subject matter can be implemented in any of numerous ways. For example, some aspects may be implemented using hardware, software or a combination thereof. When any aspect is implemented at least in part in software, the software code can be executed on any suitable processor or collection of processors, whether provided in a single device or computer or distributed among multiple devices/computers.

The present disclosure may be implemented as a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to examples of the disclosure. It will be understood that each block of the flowchart illustrations and/or block diagrams, and combinations of blocks in the flowchart illustrations and/or block diagrams, can be implemented by computer readable program instructions.

The computer readable program instructions may be provided to a processor of a, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various examples of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Other implementations are within the scope of the following claims and other claims to which the applicant may be entitled.

While various examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific examples described herein. It is, therefore, to be understood that the foregoing examples are presented by way of example only and that, within the scope of the appended claims and equivalents thereto, examples may be practiced otherwise than as specifically described and claimed. Examples of the present disclosure are directed to each individual feature, system, article, material, kit, and/or method described herein. In addition, any combination of two or more such features, systems, articles, materials, kits, and/or methods, if such features, systems, articles, materials, kits, and/or methods that are not mutually inconsistent, is included within the scope of the present disclosure.

What is claimed is:

1. A method comprising:
   presenting a user interface that includes an option to select between at least two configurations;
   initiating a first playback of an audio track for a first configuration, the first playback based on a binaural recording of a first audio system setup rendering the audio track; and
   in response to selection of a second configuration while the first playback of the audio track is occurring, switching to a second playback of the audio track, the second playback based on a binaural recording of a second audio system setup rendering the audio track, the second audio system setup different from the first audio system setup, wherein switching to the second playback of the audio track continues from where the first playback was prior to switching to the second playback.

2. The method of claim 1, wherein the user interface includes a visual for the first audio system setup and the second audio system setup.

3. The method of claim 1, wherein the user interface includes a visual indication that the second configuration has been selected, thereby indicating that the second playback of the audio track is occurring.

4. The method of claim 1, wherein the first playback is initiated automatically when the user interface is first presented.

5. The method of claim 1, wherein the first playback is initiated by user input.

6. The method of claim 1, wherein there is no interruption in audio playback when switching to the second audio playback.

7. The method of claim 1, wherein a video is presented via the user interface and playback of the video is synchronized with playback of the audio track.

8. The method of claim 1, wherein the first audio system setup includes using speakers of a television in a given environment and the second audio system setup includes using a soundbar in the given environment.

9. The method of claim 8, wherein the second audio system setup also includes using at least one of i) a remote subwoofer or ii) one or more remote surround sound speakers.

10. The method of claim 1, wherein the first audio system setup includes audio equipment and the second audio system setup includes the audio equipment but in a different environment.

11. The method of claim 10, wherein the different environment includes a room of differing size.

12. The method of claim 10, wherein the different environment includes different material within the environment.

13. The method of claim 1, further comprising prompting a user to wear headphones to improve playback of the binaural recordings.

14. The method of claim 1, wherein the binaural recordings of the first and second audio systems rendering the audio track are corrected with an equalization filter.

15. The method of claim 1, wherein the audio track is the same for the first and second playbacks of the audio track to allow a user to compare playback of the audio track by the first and second audio system setups.

16. The method of claim 1, further comprising
in response to selection of a third configuration while the second playback of the audio track is occurring, switching to a third playback of the audio track, the third playback based on a binaural recording of a third audio system setup rendering the audio track, the third audio system setup different from the first and second audio system setups,
wherein switching to the third playback of the audio track continues from where the second playback was prior to switching to the third playback.

17. The method of claim 16, further comprising
in response to selection of the first configuration while the third playback of the audio track is occurring, switching to the first playback of the audio track,
wherein switching to the first playback of the audio track continues from where the third playback was prior to switching to the first playback.

18. The method of claim 16, wherein the second and third audio system setups each include using a soundbar in a given environment.

19. The method of claim 18, wherein the third audio system setup also includes using at least one of i) a remote subwoofer or ii) one or more remote surround sound speakers.

20. The method of claim 19, wherein the first audio system setup includes using speakers of a television in the given environment.

* * * * *